United States Patent [19]
Miyazaki et al.

[11] Patent Number: 5,515,353
[45] Date of Patent: May 7, 1996

[54] OPTICAL HEAD WITH FORWARD AND RETURN LIGHT BEAM PROPAGATING ALONG A COMMON PATH

[75] Inventors: Yasuhiro Miyazaki, Akigawa; Nobuhide Matsubayashi, Hachioji, both of Japan

[73] Assignee: Olympus Optical Co., Ltd., Tokyo, Japan

[21] Appl. No.: 204,095

[22] Filed: Mar. 2, 1994

[30] Foreign Application Priority Data

Mar. 5, 1993 [JP] Japan .................................. 5-45363
Feb. 4, 1994 [JP] Japan .................................. 6-12666

[51] Int. Cl.⁶ .............................. G11B 7/00; G11B 11/00
[52] U.S. Cl. ..................... 369/112; 369/13; 369/44.14; 369/109
[58] Field of Search ................................ 369/112, 110, 369/109, 13, 44.14, 106

[56] References Cited

U.S. PATENT DOCUMENTS

| | | | |
|---|---|---|---|
| 4,150,399 | 4/1979 | Boonstra | 369/110 |
| 4,863,246 | 9/1989 | Anthon | 369/110 |
| 4,951,274 | 8/1990 | Iwanaga | 369/13 |
| 5,050,155 | 9/1991 | Kurata | 369/112 |
| 5,099,470 | 3/1992 | Matsubayashi | 369/110 |
| 5,172,368 | 12/1992 | Lehureau | 369/112 |
| 5,251,198 | 10/1993 | Strickler | 369/110 |
| 5,404,490 | 4/1995 | Matsubayashi | 359/487 |

FOREIGN PATENT DOCUMENTS

| | | |
|---|---|---|
| 63-187442 | 8/1988 | Japan . |
| 63-313335 | 12/1988 | Japan . |
| 1-86337 | 3/1989 | Japan . |
| 2301029 | 12/1990 | Japan . |

*Primary Examiner*—Georgia Y. Epps
*Assistant Examiner*—Ricky Mack
*Attorney, Agent, or Firm*—Watson Cole; Stevens Davis

[57] ABSTRACT

An optical head comprising a light source for emitting a light beam, an objective lens for focusing the light beam onto an optical record medium as a fine spot and a photodetector for receiving the light beam reflected by the optical record medium to derive an information signal, tracking error signal and focusing error signal. A Wollaston prism is arranged on an optical path along which both forward and return light beams propagate, so that the return light beam is separated from the forward light beam. The Wollaston prism is formed by cementing two wedge shaped-crystal plates having different directions of optic axes. The light source and photodetector may be arranged on a same substrate, and thus the optical head can be made small in size and less expensive in cost and can have a high reliability.

9 Claims, 14 Drawing Sheets

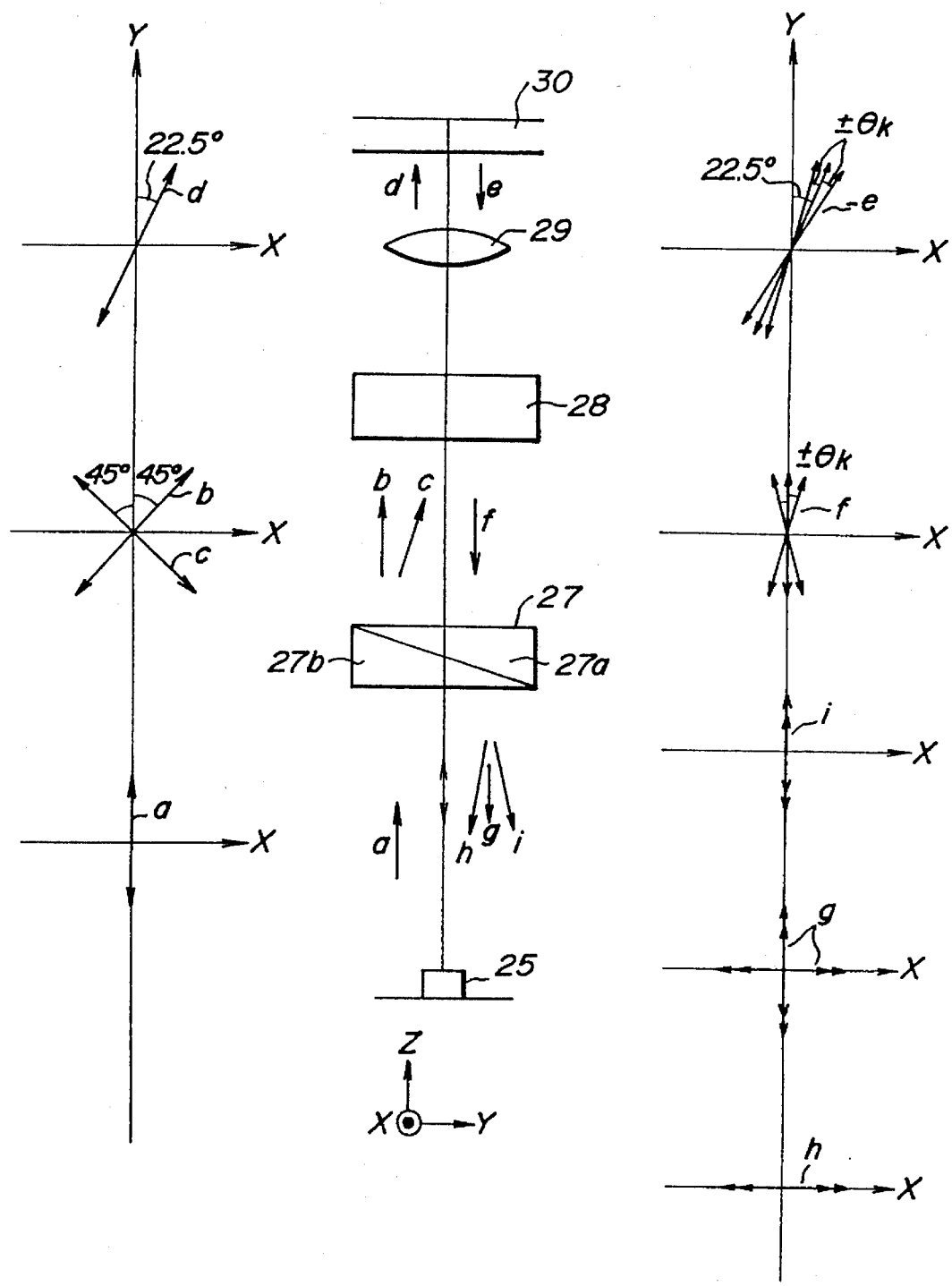

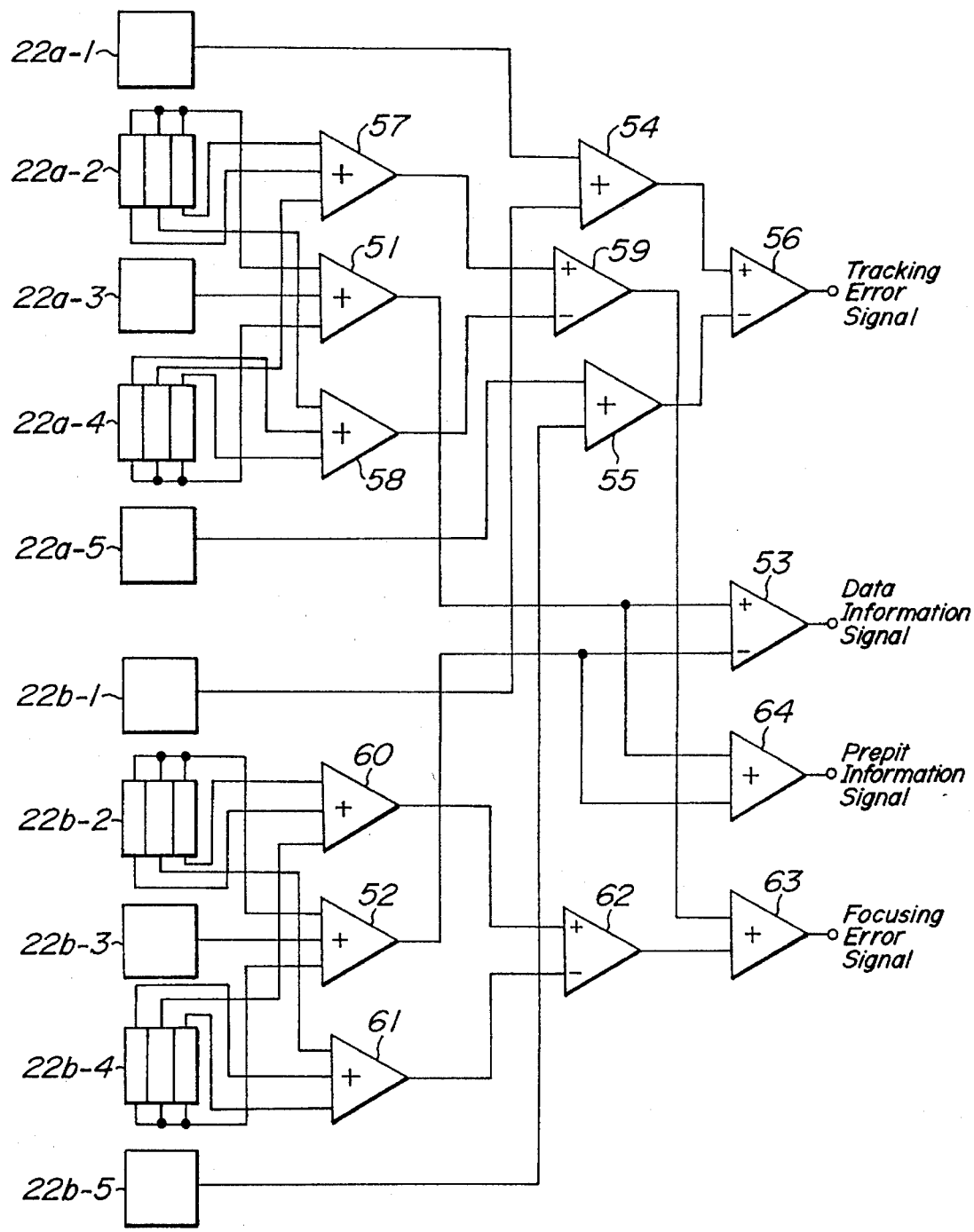
FIG_10

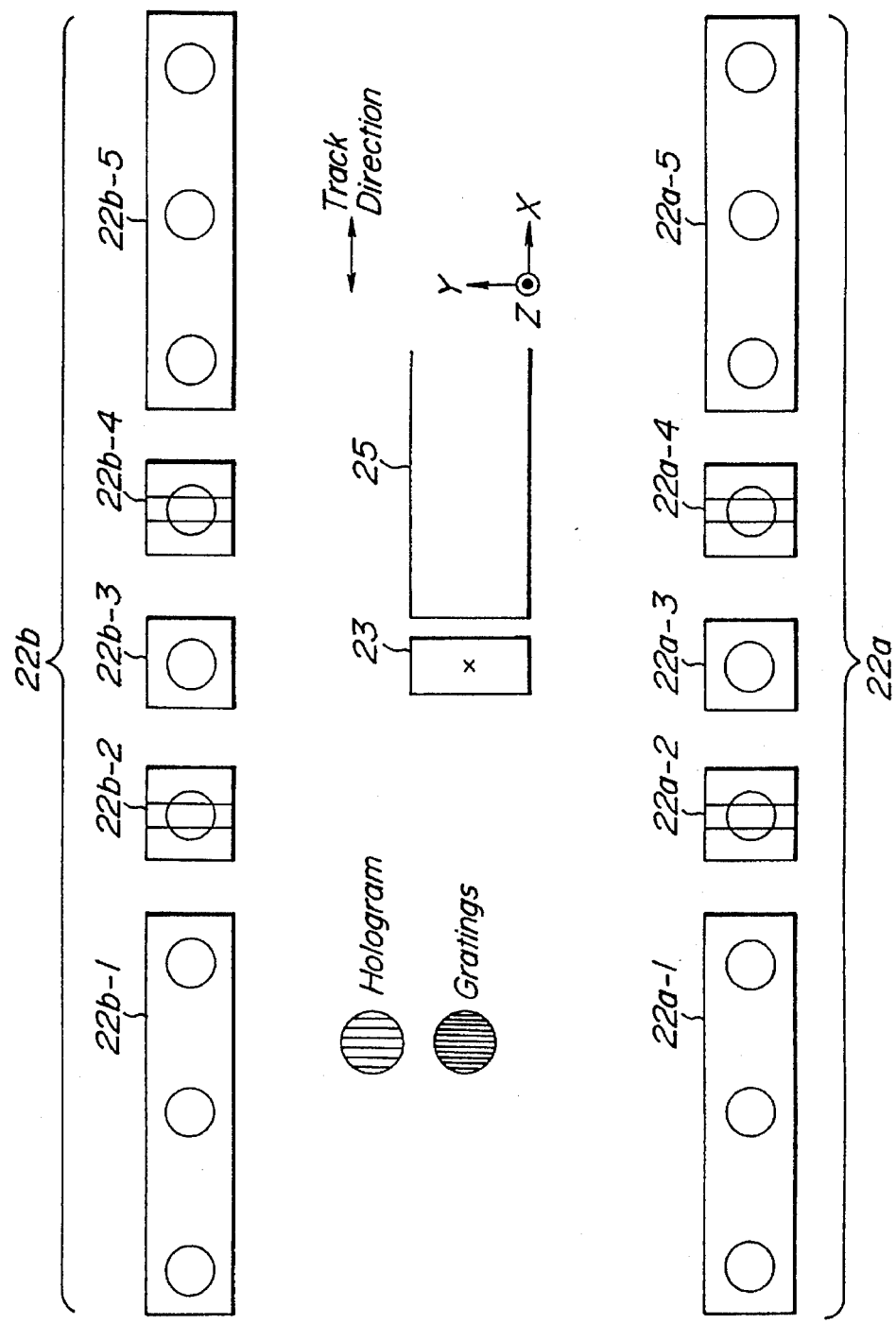

FIG_12
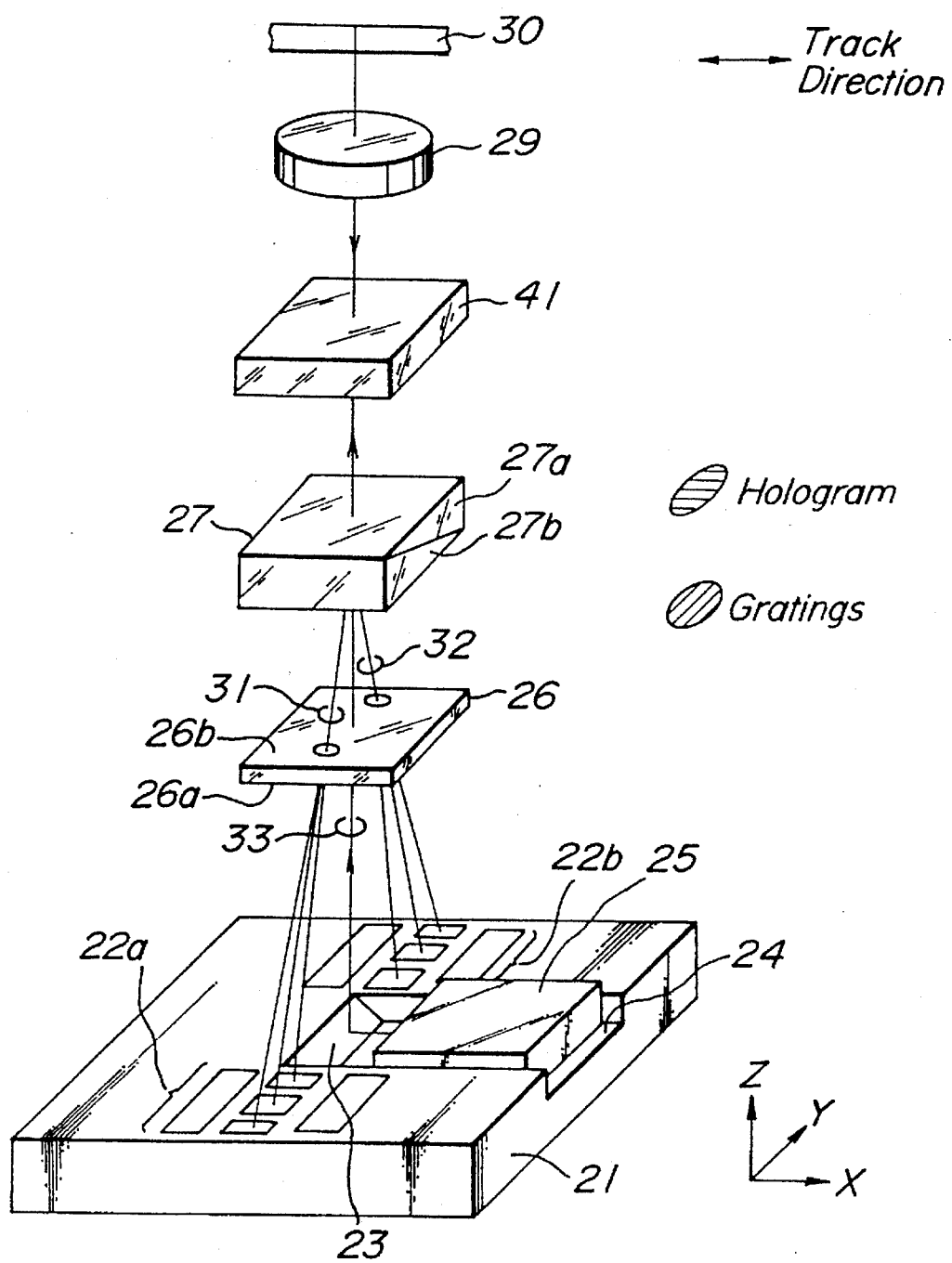

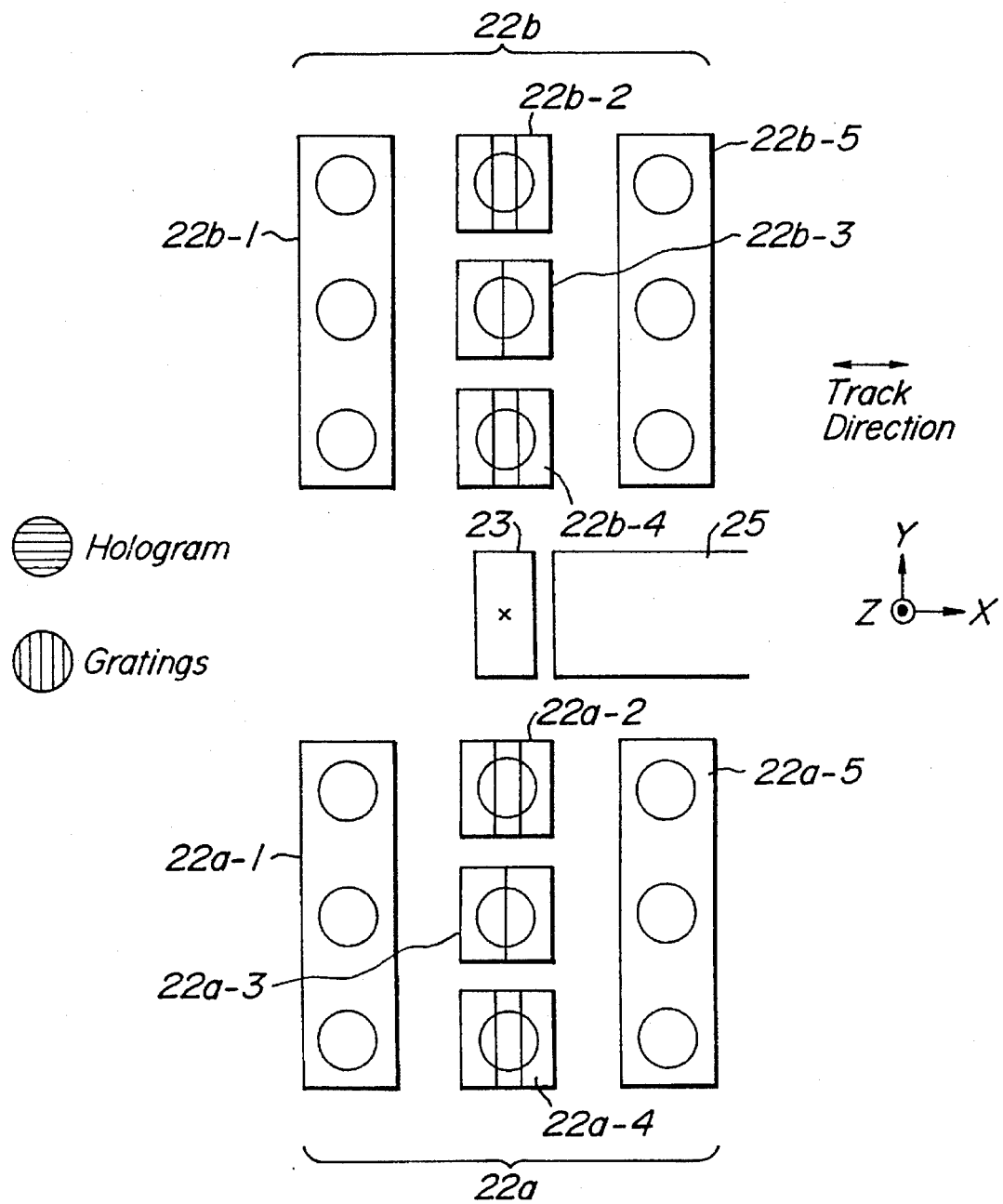
FIG_14

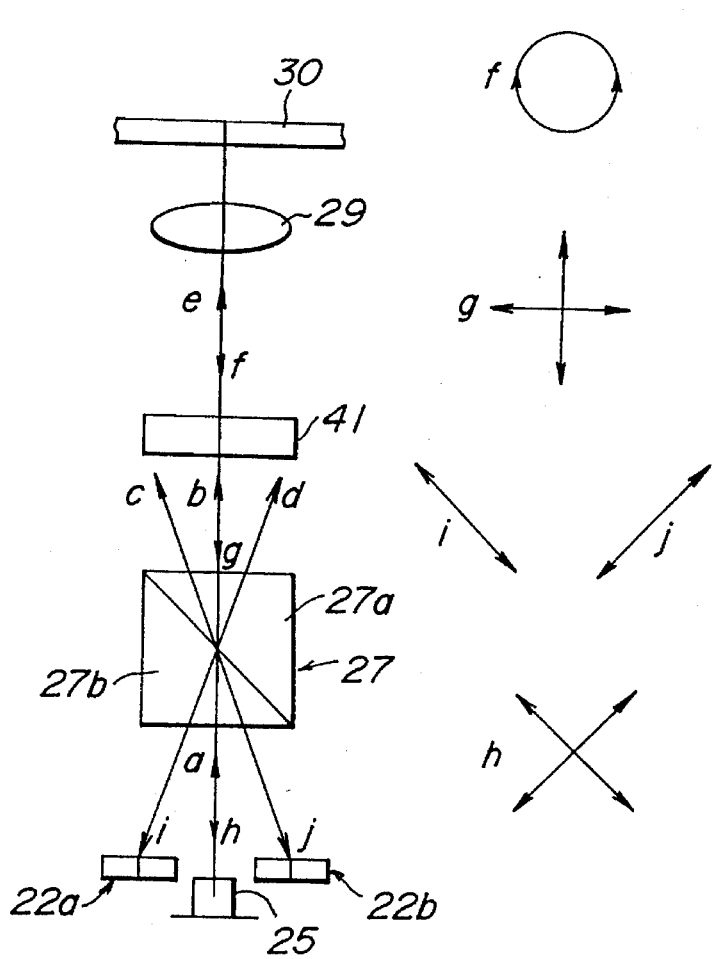
FIG._15B  FIG._15A  FIG._15C

FIG_16
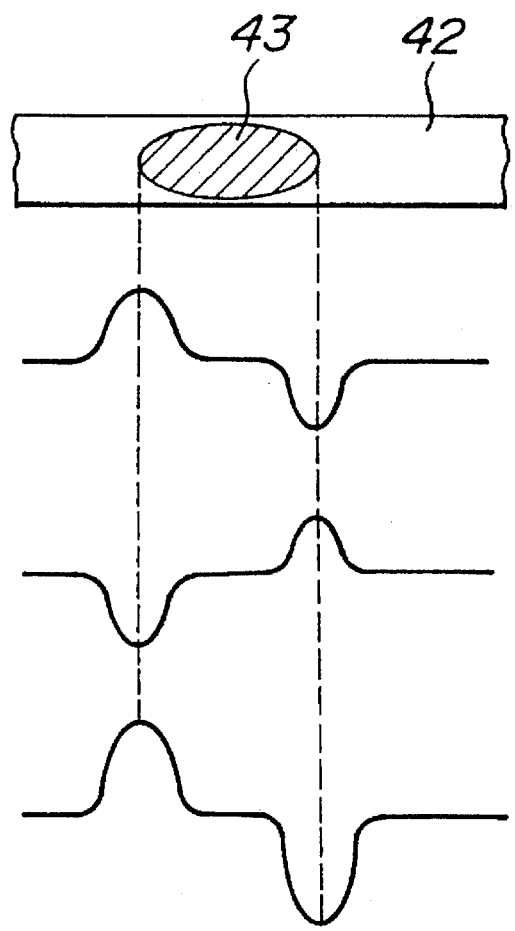

OPTICAL HEAD WITH FORWARD AND RETURN LIGHT BEAM PROPAGATING ALONG A COMMON PATH

BACKGROUND OF THE INVENTION

1. Field of the Invention

The present invention relates to an optical head including a light source emitting a light beam, an objective lens for projecting at least one light beam originating from said light beam emitted by said light source onto an optical record medium as a light spot, information being recorded on a record plane of said optical record medium, and a photodetecting means for receiving at least one light beam reflected by the optical record medium to detect the information recorded on the optical record medium and information representing a positional deviation of the light spot with respect to the record plane of the optical record medium.

2. Description of the Related Art

There have been proposed various types of the optical heads. For instance, in Japanese Patent Application Laid-open Publication Kokai Hei 2-301029, there is disclosed a known optical head. FIG. 1 shows this known optical head which is used for an apparatus for reading and writing data on and from a magneto-optical record disk. In this known optical head, a laser beam emitted from a laser diode 1 is made incident upon a polarizing beam splitter 4 by means of collimator lens 3 and beam shaping prism 19. The laser beam transmitted through the polarizing beam splitter 4 is focused onto a record layer 2a of a magneto-optical disk 2 by means of an objective lens 5. The laser beam reflected by the magneto-optical record disk 2 is made incident again upon the polarizing beam splitter 4 by means of the objective lens 5. Then, the laser beam is reflected by the polarizing beam splitter 5 is made incident upon a beam splitter 7 and is divided into two return laser beams.

One of the two laser beams reflected by the beam splitter 7 is made incident upon a first photodetector 13 having four divided light receiving regions by means of a lens system 12 including a cylindrical lens for introducing astigmatism. An output signal of the first photodetector 13 is processed by a first calculating circuit 16 to derive focusing error and tracking error signals. The other laser beam transmitted through the beam splitter 7 is made incident upon a polarizing beam splitter 9 by means of a half-wavelength plate 8. Then polarized components of the laser beam are divided and these polarized components are detected by second and third photodetectors 11 and 15 by means of condenser lenses 10 and 14, respectively. Output signals of the second and third photodetectors 11 and 15 are processed by a second calculating circuit 17 to derive an information signal representing data recorded on the record layer 2a of the magneto-optical record disk 2. There is arranged a magnetic field forming means 6 on a side of the record disk 2 which is opposite to the objective lens 5.

In the specification of this application, the optical path from the light source 1 to the record medium 2 is called a forward optical path and a light beam propagating along this forward optical path is termed as a forward light beam. The laser beam reflected by the record medium is also called a return laser beam and the optical path from the optical record medium to the photodetector along which the return laser beam propagates is sometimes termed as a return optical path. In the optical head to which the present invention belongs, a part of the forward optical path is identical with a part of the return optical path. In the optical head shown in FIG. 1, an optical path from the polarizing beam splitter 4 to the optical record medium 2 is used as the common optical path for both the forward light beam and return light beam.

In the optical head, in order to detect the return light beam, the return light beam has to be separated from the forward light beam, because the photodetector could not be arranged at the same position as the light source. In the known optical head shown in FIG. 1, the return laser beam emanating from the objective lens 5 is separated from the forward laser beam by means of the polarizing beam splitter 4. That is to say, the return laser beam is reflected by the polarizing beam splitter into a direction which is at right angles to a direction in which the forward laser beam is made incident upon the polarizing beam splitter. Therefore, the optical system of the optical head is liable to be large in size. Furthermore, the laser diode 1 and the photodetectors 11, 13 and 15 could not be provided on the same substrate or member, and thus the number of parts is increased and a reliability of the optical head might be decreased due to the temperature variation.

SUMMARY OF THE INVENTION

The present invention has for its object to provide a novel and useful optical head which can be made small in size, simple in construction and can have a high reliability.

According to the invention, an optical head comprising a light source emitting a light beam, an objective lens for projecting the light beam onto an optical record medium as a light spot, information being recorded on a record plane of said optical record medium, and a photodetecting means for receiving the light beam reflected by the optical record medium to detect information recorded on the optical record medium and information representing a positional deviation of the light spot with respect to the record plane of the optical record medium, the improvement being characterized in that a Wollaston polarizing prism is provided in an optical path along which both forward light beam and return light beam propagate, said Wollaston polarizing prism being formed by cementing two wedge-shaped crystal plates having optical axes extending in different directions.

In the optical head according to the invention, the Wollaston polarizing prism formed by cementing the two crystal plates whose optic axes extend in different directions is provided in the common optical path along which both the incident light beam and return laser beam propagate. Then, the return light beam reflected by the optical record medium emanates from the Wollaston prism toward the light source, while the return light beam can be separated from the forward light beam. Therefore, the optical system may be arranged substantially on the same rectilinear line and the light source and photodetecting means may be arranged on the same substrate.

In a preferable embodiment of the optical head according to the invention, an azimuth rotator is arranged in the common optical path between the Wollaston prism and the objective lens. In this embodiment, the polarizing plane of the return light beam being made incident upon the Wollaston prism is rotated with respect to that of the forward light beam which is made incident upon the Wollaston prism, so that an azimuth angle of the return light beam differs from that of the forward light beam, and therefore when the optical record medium is an magneto-optical record medium, it is possible to detect effectively the information recorded on the magneto-optical record medium.

In another preferable embodiment of the optical head according to the invention, a quarter-wavelength plate is arranged in the common optical path between the Wollaston prism and the objective lens.

In this embodiment, the linearly polarized forward light beam emanating from the Wollaston prism is made incident upon the optical record medium as a circularly polarized light beam, and further the circularly polarized return light beam is made incident upon the Wollaston prism as the linearly polarized light beam. Therefore, when the optical record medium is the magneto-optical record medium, it is possible to detect the information recorded on the magneto-optical record medium.

In another preferable embodiment of the optical head according to the invention, a forward light beam which is not refracted by the Wollaston prism is made incident upon the optical record medium as a recording/reproducing light beam. In this embodiment, when the diverging light beam is made incident upon the Wollaston prism, the aberration free light beam can be used as the recording/reproducing light beam.

BRIEF DESCRIPTION OF THE DRAWINGS

FIGS. 9A, 9B and 9C are diagrams illustrating the construction and function of the optical system of the embodiment of FIG. 2;

FIG. 10 is a circuit diagram of a signal processing circuit for deriving the information signal, focusing error signal and tracking error signal;

FIG. 11 is a schematic view depicting a second embodiment of the optical head according to the invention;

FIG. 12 is a schematic view showing a third embodiment of the optical head according to the invention;

FIG. 14 is a plan view depicting the photodetecting means shown in FIG. 12;

FIGS. 15A, 15B and 15C are diagrams showing the construction and function of the optical system in the embodiment shown in FIG. 12; and FIG. 16 is a diagram sowing the detecting function of the magneto-optical signal in the embodiment shown in FIG. 12.

DESCRIPTION OF THE PREFERRED EMBODIMENTS

Figure 1:
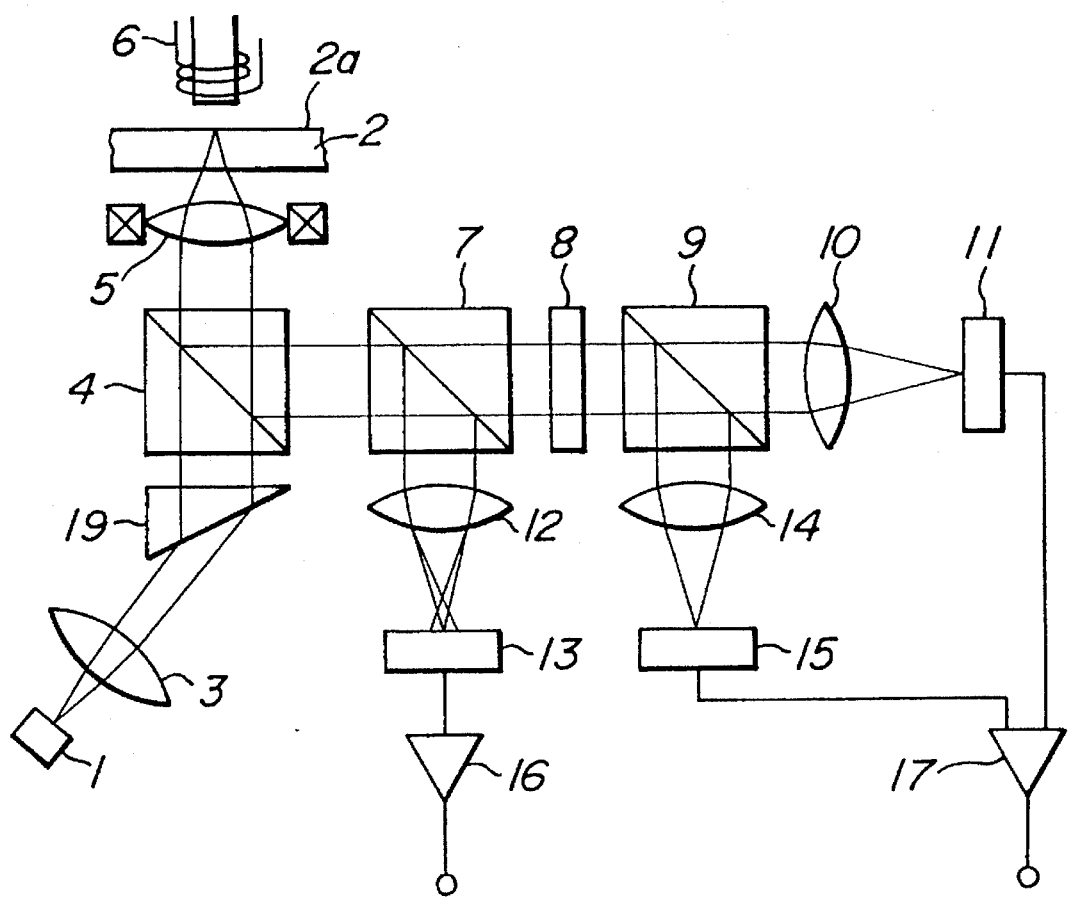
FIG. 1 is a schematic view showing the known optical head.
Figure 2:
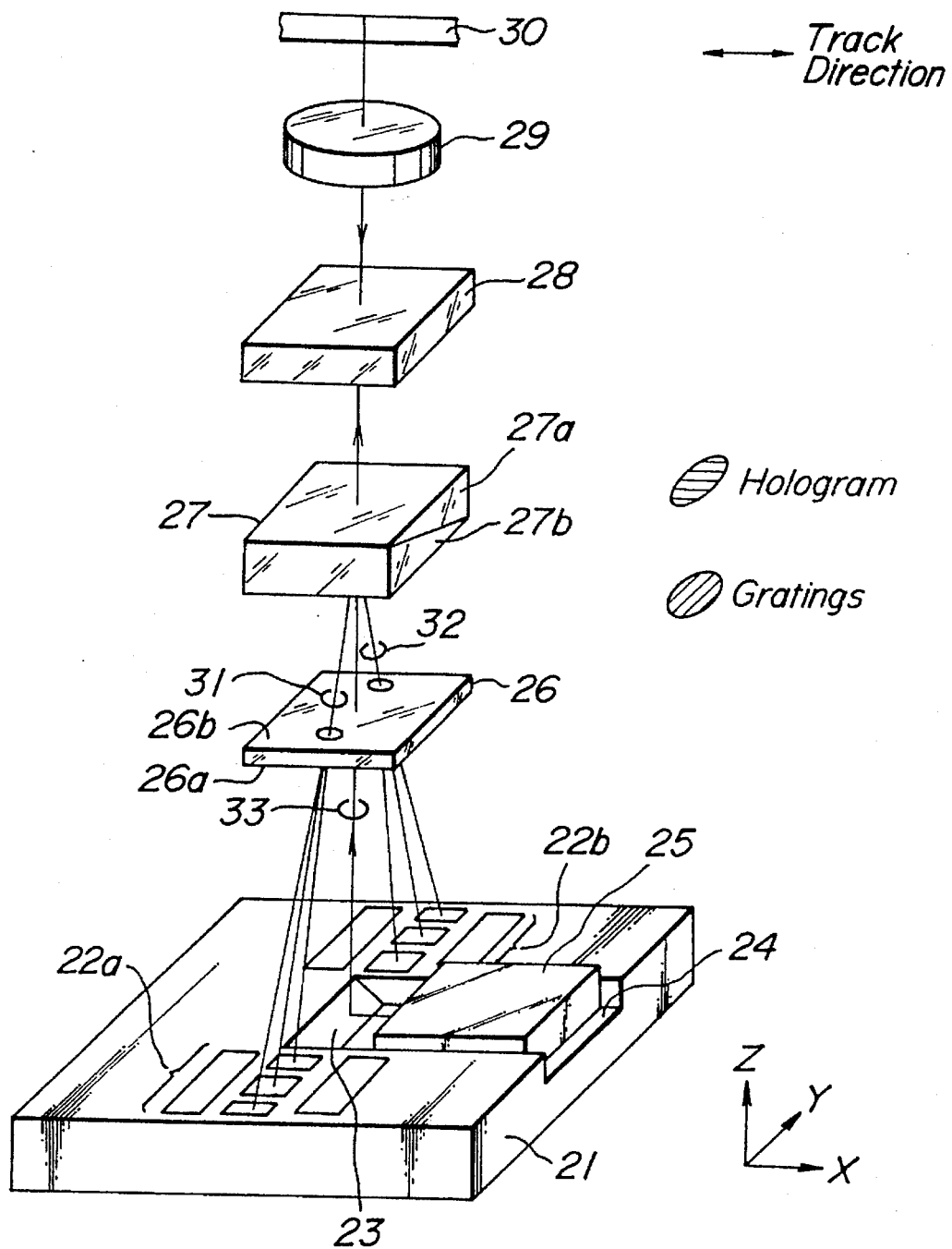
FIG. 2 is a schematic view illustrating a first embodiment of the optical head according to the invention.

FIG. 2 is a schematic view showing a first embodiment of the optical head according to the invention. The optical head of the present embodiment is utilized for recording/reproducing on/from a magneto-optical record disk 30. The optical head comprises a semiconductor substrate 21 in which are formed a light receiving sections 22a and 22b, a reflection mirror 23 and a step 24. On the step 24 there is arranged a semiconductor laser 25. The optical head further comprises an optical element 26 having diffraction gratings 26a for dividing a forward light beam emitted by the semiconductor laser 25 into three light beams and a hologram 26b for dividing a return light beam into a plurality of light beams, a three-beam type Wollaston polarizing prism 27, an azimuth rotator 28 such as a Faraday rotator and an objective lens 29. For the sake of simplicity, in the specification, this prism is simply called a Wollaston prism.

In the present embodiment, a laser beam 33 emitted laterally by the semiconductor laser 25 is reflected by the reflection mirror 23 upward and is made incident upon the optical element 26. Then, the laser beam is converted by the diffraction gratings 26a into a single main beam and two sub-beams, and these three laser beams are made incident upon the magneto-optical record disk 30 as light spots by means of the Wollaston prism 27, azimuth rotator 28 and objective lens 29.

The Wollaston prism 27 is formed by cementing two wedge-shaped crystal plates 27a and 27b whose optic axes extend in different directions. That is to say, an azimuth angle of a major axis of a Normal-ellipsoide of one crystal plate 27a is different from that of the other crystal plate 27b. Polarizing planes of three laser beams which emanate from the Wollaston prism 27 without being refracted are rotated by the azimuth rotator 28. It should be noted that a direction of the diffraction gratings 26a formed on the lower surface of the optical element 26 is substantially parallel with a direction Y which is perpendicular to a track direction X in which data tracks on the magneto-optical disk 30 extend.

In this manner, the three laser beams are made incident upon the magneto-optical record disk 30 and are reflected thereby. Then, the return laser beams reflected by the magneto-optical record disk 30 are made incident again upon the azimuth rotator 28 by means of the objective lens 29, and the polarizing planes of these return laser beams are rotated by the azimuth rotator and are made incident upon the Wollaston prism 27. The return laser beams are made incident upon the Wollaston prism 27 at azimuth angles which are different from those of the forward laser beams, and thus each of the return laser beams is converted into a single laser beam which propagates without being refracted and two refracted beams 31, 32, said single non-refracted beam and two refracted beams being separated from each other substantially in the direction Y. Further, each of the refracted laser beams 31 and 32 is divided by the hologram 26b of the optical element 26 into three laser beams which are separated from each other in the direction X. Then, a plurality of laser beams are received by the photodetecting sections 22a and 22b. It should be noted that a direction of the hologram 26b of the optical element 26 is substantially identical with the direction X, so that each of the three return beams is divided by the hologram 26b in the direction Y.

Figure 3:
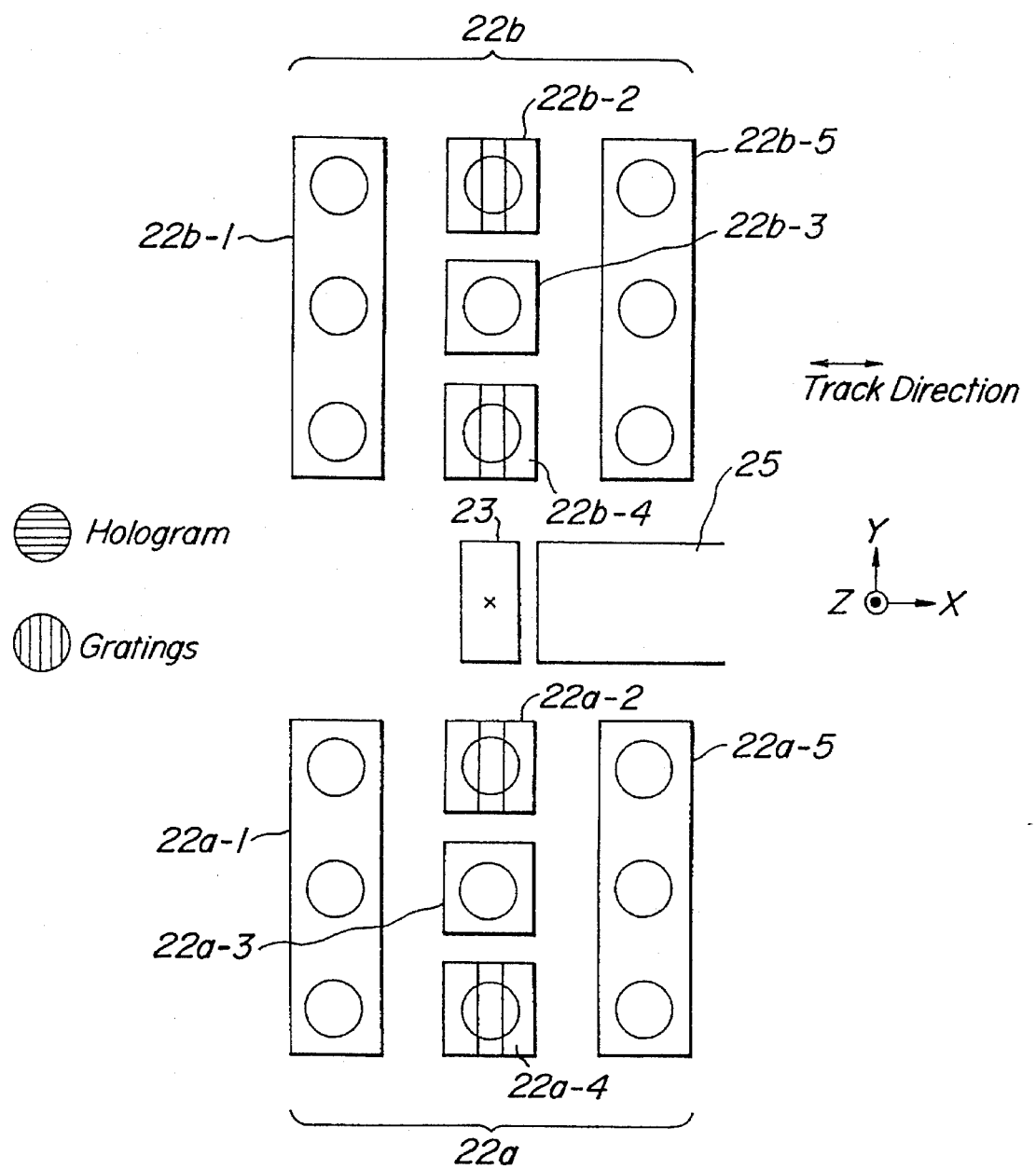
FIG. 3 is a schematic plan view depicting the photodetecting means of the optical head shown in FIG. 2.

FIG. 3 is a plan view showing the construction of the photodetecting sections 22a and 22b. The photodetecting section 22a includes light receiving elements 22a-1 and 22a-5 which extend in the direction Y in parallel with each other, and three light receiving elements 22a-2, 22a-3 and 22a-4 which are aligned in the direction Y and are separated from each other. Each of the light receiving elements 22a-2 and 22a-4 has three light receiving regions which are divided in the direction X. The construction of the other photodetecting section 22b is similar to the photodetecting section 22a and includes five light receiving elements 22b-1 to 22b-5. The first photodetecting section 22a is provided for receiving a plurality of laser beams which are originated from the return laser beam 31 refracted by the Wollaston prism 27 and are divided by the hologram 26b of the optical element 26. The second photodetecting section 22b is provided to receive a plurality of laser beams which are originated from the return laser beam 32 refracted by the Wollaston prism 27 and are divided by the hologram 26b of the optical element 26.

In the photodetecting section 22a, three laser beams of the main-laser beam is are made incident upon the light receiving elements 22a-2, 22a-3 and 22a-4, three laser beams of one of the two sub-laser beams are made incident upon the light receiving element 22a-1, and the three laser beams of the other sub-laser beam are made incident upon the light receiving element 22a-5. Similarly, three laser beams of the main-laser beam is are made incident upon the light receiving elements 22b-2, 22b-3 and 22b-4, three laser beams of one of the two sub-laser beams are made incident upon the light receiving element 22b-1, and the three laser beams of the other sub-laser beam are made incident upon the light receiving element 22b-5.

By processing output signals from the light receiving elements 22a-1, 22a-4, 22b-2 and 22b-4 there is derived a focusing error signal by means of the beam size method, and by deriving a difference between a sum of output signals from the light receiving elements 22a-1 and a sum of output signals from the light receiving elements, it is possible to derive a tracking error signal. Furthermore, an information signal can be obtained by deriving a difference between a sum of the output signals from the light receiving elements 22a-2, 22a-3 and 22a-4 and a sum of the light receiving elements 22b-2, 22b-3 and 22b-4.

Now the principle of the function of the Wollaston prism 27 shown in FIG. 2 will be explained.

Figure 4:
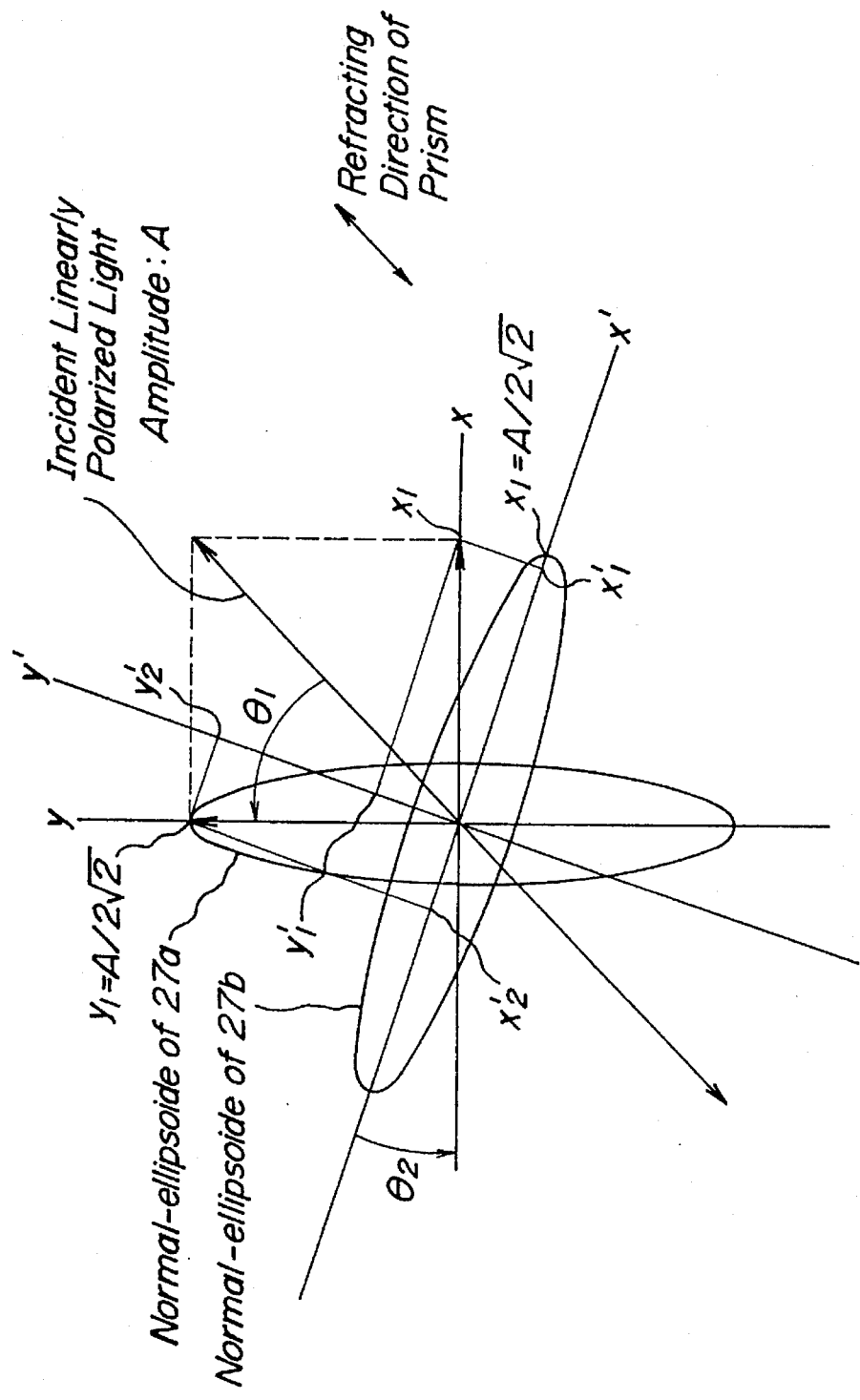
FIG. 4 is a diagram showing, on a two-dimensional coordinate system, an azimuth angle of the incident light beam upon the Wollaston prism and an azimuth angle of Normal-ellipsoides on the record medium side and the light source side.
Figure 5:
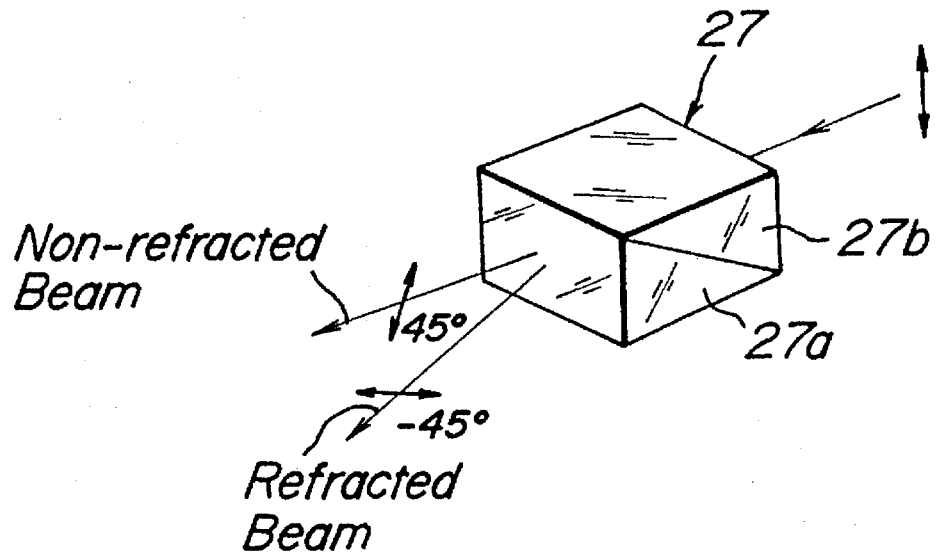
FIG. 5 is a schematic view representing the forward light beam transmitted through the Wollaston prism.
Figure 6:
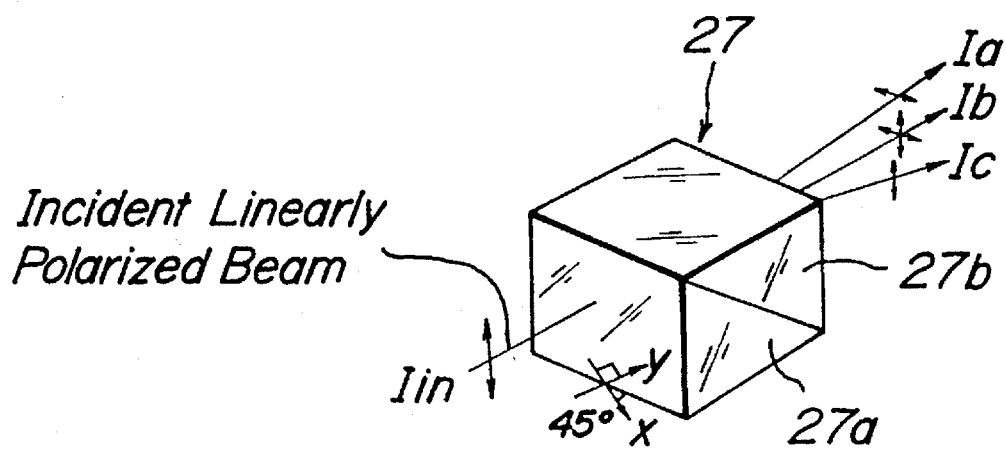
FIG. 6 is a schematic view showing the return light beam divided into a plurality of return light beams by means of the Wollaston prim.

FIG. 4 shows two-dimensional coordinates representing a polarizing direction of the linearly polarized light beam which is made incident upon the Wollanston's prism 27 and azimuth angles of the Normal-ellipsoides of the crystal plate 27a which is positioned on a side of the record medium and the crystal plate 27b which is arranged on a side facing the light source. FIG. 5 is a schematic view depicting the light beams which are transmitted through the Wollaston prism 27 along the forward optical path, and FIG. 6 is a schematic view illustrating the light beams which are transmitted through the Wollanstan's prism along the return optical path. In the return optical path, the return light beam Iin is divided into a first refracted light beam Ia, a non-refracted light beam Ib and a second refracted light beam Ic. The intensity of these light beams may be expressed by the following equations (1) to (3) from the diagram shown in FIG. 4.

$$Ia = (2x_1')^2 = (2x_1\cos\theta_2)^2 \quad (1)$$
$$= (2 \cdot A/2 \cdot \sin\theta_1 \cdot \cos\theta_2)^2$$

$$Ic = (2y_2')^2 = (2y_1\cos\theta_2)^2 \quad (2)$$
$$= (2 \cdot A/2 \cdot \cos\theta_1 \cdot \cos\theta_2)^2$$

$$Ib = (2y_1')^2 + (2x_2')^2 = (2x_1\sin\theta_2)^2 + (2y_1\sin\theta_2)^2 \quad (3)$$
$$= (2 \cdot A/2 \cdot \sin\theta_1 \cdot \sin\theta_2)^2 + (2 \cdot A/2 \cdot \cos\theta_1 \cdot \sin\theta_2)^2$$
$$= A^2\sin^2\theta_2(\sin^2\theta_1 + \cos^2\theta_1) = A^2\sin^2\theta_2$$

Here the intensity Iin of the incident light may be represented by the following equation (4), so that the intensity of the light beams may be expressed by the following equation (5).

$$Iin = Ia + Ib + Ic = A^2 \quad (4)$$

$$\left.\begin{array}{l} Ia = Iin \cdot \sin^2\theta_1 \cdot \cos^2\theta_2 \\ Ib = Iin \cdot \sin^2\theta_2 \\ Ic = Iin \cdot \cos^2\theta_1 \cdot \cos^2\theta_2 \end{array}\right\} \quad (5)$$

From the above, the following can be derived. That is, when the azimuth angle $\theta_1$ of the Normal-ellipsoide of the crystal plate 27a is set to, for instance, 45°, the intensities of the first and second refracted light beams Ia and Ic become identical with each other regardless of the azimuth angle $\theta_2$ of the crystal plate 27b, and further the intensity of the non-refracted light beam Ib is determined solely by the azimuth angle $\theta_1$ regardless of the azimuth angle $\eta_2$. Therefore, when $\theta_1=\theta_2=45°$, Ia/Iin=Ic/Iin=0.25 and Ib/Iin=0.5.

When the Wollaston prism 27 is set in the manner explained above, in the forward light path shown in FIG. 5, the incident light beam is divided by the Wollaston prism 27 into a non-refracted light beam and a refracted light beam, the polarizing directions of these light beams are at right angles to each other in a plane which is perpendicular to the propagating direction of the incident light beam. In the return light path illustrated in FIG. 6, the incident light beam Iin is divided by the Wollaston prism 27 into the first refracted light beam Ia whose polarizing direction is perpendicular to the polarizing direction of the incident light beam, the non-refracted light beam Ib having the polarized components parallel with and perpendicular to the polarizing direction of the incident light beam, and the second refracted light beam Ic having a polarized component parallel with the polarizing direction of the incident light beam.

Figure 7:
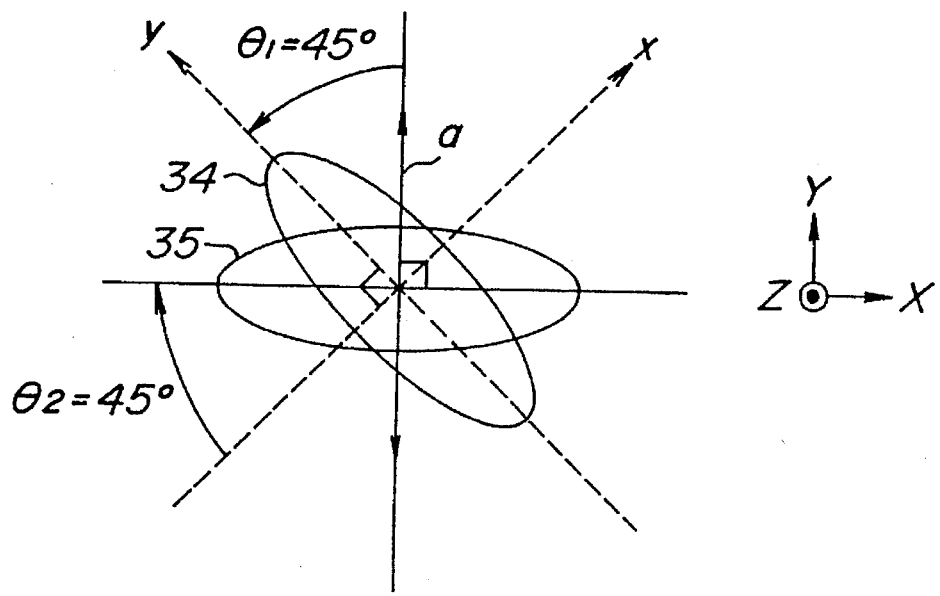
FIG. 7 is a diagram representing a polarizing direction of the linearly polarized light beam emitted from the light source and the direction of the Normal-ellipsoides of the crystal plates.
Figure 8:
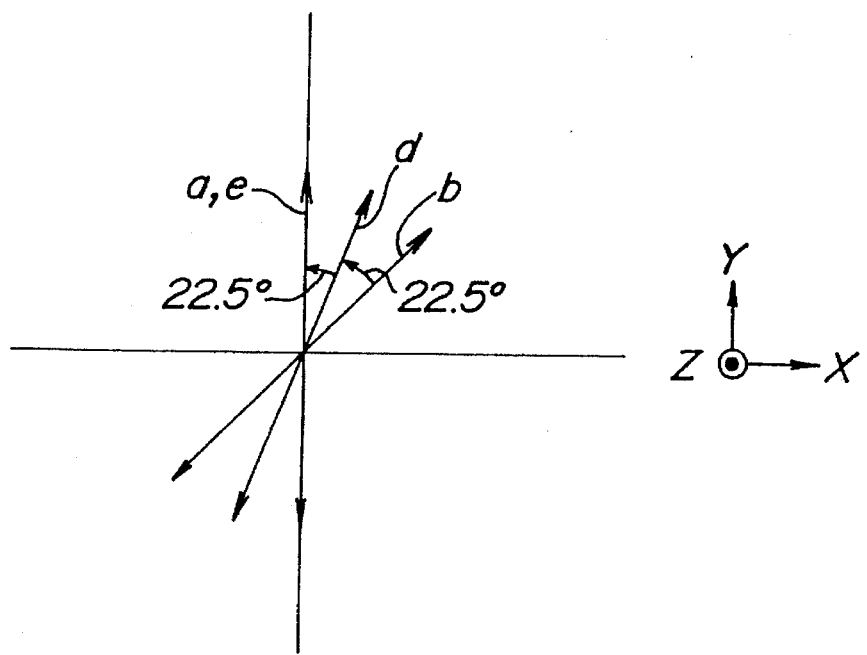
FIG. 8 is a diagram showing the rotation of the polarizing plane by the azimuth rotator.

FIGS. 7 to 9C show the variation in the polarizing condition of the light beams. FIG. 7 illustrates the polarizing direction of the incident linearly polarized light beam on the incident light path and the azimuth angles of the Normal-elliopsoides of the crystal plates 27a and 27b of the Wollaston prism 27, FIG. 8 shows the rotation of the polarizing plane by the rotator 28, and FIGS. 9A to 9C represent the variation of the polarizing directions in the whole optical system. Now it is assumed that the laser beam 33 emitted from the semiconductor laser 25 is a linearly polarized light beam a having a polarizing direction Y and a unit intensity of 1. This light beam a is made incident upon the Wollaston prism 27 and is divided into a recording and reproducing light beam b having an intensity of 0.5 and having an azimuth angle 45° and a light beam c which is not utilized for recording and reproducing. The light beam b is converted into a light beam d whose polarizing direction has been rotated by 22.5° by means of the rotator 28 and then this light beam d is made incident upon the magneto-optical record disk 30.

A light beam e is reflected by the magneto-optical record disk 30 has a polarizing direction which is rotated by $\pm\theta_k$ due to the Kerr rotation in accordance with the magnetizing direction in the magneto-optical record disk. The return light beam e is then made incident upon the rotator 28 and whose polarizing direction is rotated by 22.5° and is converted into a light beam f whose polarizing direction is inclined by $\pm\theta_k$ with respect to the axis Y. This light beam f is made incident upon the Wollaston prism 27 and is divided into a non-refracted light beam g having an intensity of 0.5×0.5=0.25 and the orthogonally polarized components, and first and second refracted light beams i and h whose intensity is varied in accordance with the Kerr rotation about a value of 0.5×0.5=0.25. As explained above, the light beams i and h are utilized for reproducing the information from the magneto-optical record disk 30.

The information signal may be obtained by deriving a difference between the output signals of the light receiving elements 22a and 22b which separately receive the light beams i and h, respectively. Furthermore, the focusing error signal may be derived by the beam size method. For the two sub-beams the similar process is effected to obtain the tracking error signal.

FIG. 10 is a circuit diagram showing a circuit for processing the output signals from the photodetecting means to derive the information signal, focusing error signal and tracking error signal. The output signals from the light receiving elements 22a-2, 22a-3 and 22a-4 are accumulated by an adding circuit 51 to derive a first sum and similarly the output signals from the light receiving elements 22b-2, 22b-3 and 22b-4 are added to each other in an adding circuit 52 to derive a second sum. Then, a difference between the first and second sums is derived by a subtracting circuit 53 to produce the data information signal. The output signals from the light receiving elements 22a-1 and 22b-1 are added to each other by an adding circuit 54 to derive a third sum, the output signals from the light receiving elements 22a-5 and 22b-5 are added to each other by an adding circuit 55 to derive a fourth sum, and then a difference between the third and fourth sums is derived by a subtracting circuit 56 to obtain the tracking error signal. The output signals from the outer light receiving regions of the element 22a-2 and the output signal from the middle light receiving region of the element 22a-4 are added by an adding circuit 57 to derive a fifth sum, the output signal from the middle light receiving region of the element 22a-2 is added to the output signals from the outer light receiving regions of the element 22a-4 by an adding circuit 58 to derive a sixth sum, and then a difference between the fifth and sixth sums is derived by a subtracting circuit 59. Similarly, the output signals from the outer light receiving regions of the element 22b-2 and the output signal from the middle light receiving region of the element 22b-4 are added by an adding circuit 60 to derive a seventh sum, the output signal from the middle light receiving region of the element 22b-2 is added to the output signals from the outer light receiving regions of the element 22b-4 by an adding circuit 61 to derive an eighth sum, and then a difference between the seventh and eighth sums is derived by a subtracting circuit 62. The thus obtained differences produced by the subtracting circuits 59 and 62 are added to each other by an adding circuit 63 to derive the focusing error signal. On the magneto-optical record disk 30, there are also recorded prepits representing information for managing the disk. In order to reproduce this prepit information signal, the outputs of the adding circuits 51 and 52 are added to each other by an adding circuit 64.

As explained above, in the present embodiment, the Wollaston prism 27 of three beam type is arranged in the optical path which is common to the forward light beam and return light beam, so that the return light beams reflected by the magneto-optical record disk 30 can be made incident upon the photodetecting sections 22a and 22b by means of the Wollaston prism separately from the forward light beam. Therefore, the various elements of the optical system can be aligned substantially along a straight line, and the photodetecting sections 22a and 22b may be provided on the same semiconductor substrate 21 on which the semiconductor laser 25 is provided, and thus the whole optical head can be made small in size, light in weight and less expensive in cost, and further the reliability of the optical head is hardly affected by the temperature variation.

Moreover, in the present embodiment, the azimuth rotator 28 is provided in the common optical path between the Wollaston prism 27 and the objective lens 29, so that the polarizing planes of the forward light beams and return light beams are rotated such that the azimuth angles of the light beams which are made incident upon the Wollaston prism can be made different from each other, so that the information recorded on the magneto-optical record disk 30 can be detected at a high precision. The three light beams which are not refracted by the Wollaston prism 27 are used as the main beam for detecting the information signal and focusing error signal and as the two sub-beams for detecting the tracking error signal, and therefore the influence of the aberration can be effectively avoided and the detection of the information signal, focusing error signal and tracking error signal can be performed at a high precision.

FIG. 11 is a schematic view showing the construction of the photodetecting means of a second embodiment of the optical head according to the invention. The present embodiment differs from the first embodiment in the point that the direction of the second diffraction gratings of the hologram 26 is perpendicular to the track direction X of the magneto-optical record disk and is identical with the direction of the first diffraction gratings for obtaining the three beams, the photodetecting sections 22a and 22b comprise light receiving elements 22a-1 to 22a-5 and 22b-1 to 22b-5 which are separated from each other in the direction X, and each of the light receiving elements 22a-2, 22a-4, 22b-2 and 22b-4 comprises three light receiving regions which are divided in the direction X. The remaining construction of the present embodiment is same as the first embodiment.

In the present embodiment, the photodetecting section 22a receives the nine light beams which are originated from the refracted return light beams 31 emanating from the Wollaston prism 27 and are separated from each other by the hologram 26b of the optical element 26. That is to say, the three beams of the main light beam are made incident upon the light receiving elements 22a-2, 22a-3 and 22a-4, the three beams originating from one of the two sub-beams are made incident upon the light receiving element 22a-1 and the three beams originating from the other sub-beam are made incident upon the light receiving element 22a-5. Similarly, the photodetecting section 22b receives the nine light beams which are originated from the refracted light beams 32 and are separated from each other by the hologram 26b of the optical element 26. The three beams of the main light beam are made incident upon the light receiving elements 22b-2, 22b-3 and 22b-4, the three beams originating from one of the two sub-beams are made incident upon the light receiving element 22b-1 and the three beams originating from the other sub-beam are made incident upon the light receiving element 22b-5.

Therefore, the focusing error signal can be obtained by processing the output signals from the light receiving elements 22a-2, 22a-4, 22b-2 and 22b-4 in the same manner as that of the first embodiment by the beam size method, the tracking error signal can be obtained by deriving a difference between a sum of the output signals from the light receiving elements 22a-1 and 22b-1 and a sum of the output signals from the light receiving elements 22a-5 and 22b-5, and the information signal can be obtained by deriving a difference between a sum of the output signals from the light receiving elements 22a-2, 22a-3 and 22a-4 and a sum of the output signals from the light receiving elements 22b-2, 22b-3 and 22b-4.

In the present embodiment, the light receiving elements of each of the photodetecting sections 22a and 22b can be aligned linearly, so that they can be manufactured simply.

Figure 13A:
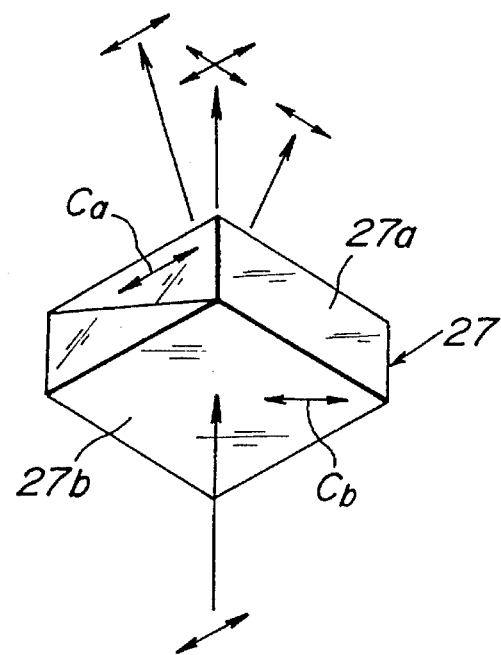
FIGS. 13A and 13B are diagrams representing the beam dividing function of the Wollaston prism shown in FIG. 12.
Figure 13B:
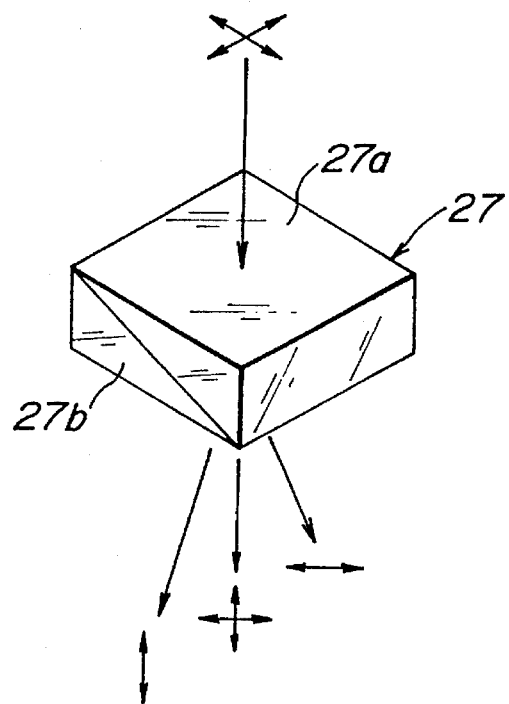

FIG. 12 is a schematic view showing the construction of a third embodiment of the optical head according to the invention. In the present embodiment, there is arranged a quarter-wavelength plate 41 instead of the azimuth rotator 28. The quarter-wavelength plate 41 is arranged such that its optic axis is inclined by 45° with respect to the directions X and Y. As shown in FIG. 13A, when the linearly polarized light beam is made incident upon the Wollaston prism 27, three light beams emanate from the Wollaston prism. The Wollaston prism 27 is formed by cementing two wedge-shaped crystal plates 27a and 27b having optic axes Ca and Cb. A non-refracted center light beam having a polarized component whose polarizing direction is parallel with that of the incident linearly polarized light beam and a polarized component whose polarizing direction is perpendicular to that of the incident linearly polarized light beam, and two refracted light beams whose polarizing directions are parallel with and perpendicular to the polarizing direction of the incident linearly polarized light beam, respectively. When the return light beams having the mutually orthogonal polarizing directions are made incident upon the Wollaston prism 27 as illustrated in FIG. 13B, a non-refracted center light beam having polarizing components whose polarizing directions have been rotated by 45° with respect to those of the incident light beam, and two refracted linearly polarized light beams whose polarizing directions have been rotated by 45° with respect to those of the incident light beam emanate from the Wollaston prism.

FIG. 14 is a schematic plan view showing the construction of the photodetecting means of the present embodiment. In the present embodiment, each of the light receiving elements 22a-3 and 22b-3 is formed to have two light receiving regions divided in the direction X. The remaining construction of the photodetecting means of the present embodiment is same as that of the first embodiment. Now the variation of the polarizing condition of the main light beam will be explained with reference to FIGS. 15A, 15B and 15C. FIG. 15A shows the optical system, FIG. 15B illustrates the variation of the polarizing condition of the forward light beam, and FIG. 15C depicts the variation of the polarizing condition of the return light beam. The laser beam emitted from the semiconductor laser 25 is a linearly polarized beam a and this linearly polarized beam is made incident upon the Wollaston prism 27. Then the laser beam a is converted into a non-refracted center beam b having polarized components whose polarized components are in parallel with and perpendicular to the polarizing direction of the incident linearly polarized beam a, and two refracted light beams c and d whose polarizing directions are in parallel with and perpendicular to that of the incident linearly polarized light beam, respectively. The non-refracted center light beam b is converted by the quarter-wavelength plate 41 having the azimuth angle of 45° into right-hand and left-hand circularly polarized light beams e and these circularly polarized light beams are made incident upon the magneto-optical record disk 30 as a fine light spot by means of the objective lens 29.

The light beam f reflected by the magneto-optical disk 30 is made incident upon the quarter-wavelength plate 41 by means of the objective lens 29 and the right-hand and left-hand circularly polarized components of the beam f are converted into linearly polarized components g whose polarizing directions are mutually orthogonal to each other. These polarized components in the light beam g are then made incident upon the Wollaston prism 27 and are divided into a non-refracted center light beam h having linearly polarized components whose polarizing directions have been rotated by 45° with respect to the polarized components of the light beam g, and two refracted light beams i and j which correspond to te left-hand and right-hand circularly polarized components whose polarizing directions have been rotated by 45° with respect to those of the polarized components of the incident beam g.

Each of the refracted light beams i and j corresponding to the left-hand and right-hand circularly polarized components and emanating from the Wollaston prism 27 is divided into three light beams by means of the hologram element 26. The three light beams of the refracted light beam i are made incident upon the light receiving elements 22a-2, 22a-3 and 22a-4, respectively, and similarly the three light beams of the refracted light beam j are made incident upon the light receiving elements 22b-2, 22b-3 and 22b-4. One of the two sub-beams is divided into six light beams in a similar manner and these six light beams are made incident upon the light receiving elements 22a-1 and 22b-1, and the other of the two sub-beams are also divided into six light beams and these six light beams are made incident upon the light receiving elements 22a-5 and 22b-5 as shown in FIG. 14.

In the present embodiment, the information signal can be obtained by deriving a difference between a difference between output signals from the two light receiving regions of the light receiving element 22a-3 and a difference between output signals from the two light receiving regions of the light receiving element 22b-3. The tracking error signal can be derived from a difference between a sum of the output signals of the light receiving elements 22a-1 and 22b-1 and a second sum of the output signals of the light receiving elements 22a-5 and 22b-5. The focusing error signal can be obtained by processing the output signals from the light receiving elements 22a-2, 22a-4, 22b-2 and 22b-4 in the same manner as that of the previous embodiment.

When the circularly polarized light beam is made incident upon the magneto-optical disk 30, the phase is delayed or advanced due to the Kerr effect in accordance with the direction of the magnetization, and at a position where the direction of the magnetization is reversed, there is generated a phase difference within the light spot, so that a distribution of an amount of the light in a far field becomes asymmetrical. Therefore, when the return light beam is received by the light receiving elements 22a-3 and 22b-3 which are arranged at a far field, it is possible to derive an edge signal at a record mark or pit 43 on an information track 42 as shown in FIG. 16. That is to say, the information signal can be obtained by deriving a difference between a first difference between the output signals from the two light receiving regions of the light receiving element 22a-3 and a second difference between the output signals from the two light receiving regions of the light receiving element 22b-3 as shown in FIG. 16. In the present embodiment, the left-hand and right-hand circularly polarized components are made incident upon the light receiving elements 22a-3 and 22b-3, so that a polarity of the first difference obtained by the output signals from the light receiving element 22a-3 is opposite to that of the second difference derived by the output signals from the light receiving element 22b-3. Therefore, by deriving a difference between the first and second differences, noise can be cancelled out and S/N of the reproduced information signal can be improved.

Also in the present embodiment, it is possible to attain the same advantages as those of the first embodiment. Furthermore, in the present embodiment, use can be made of the quarter-wavelength plate instead of the Faraday rotator which requires a means for applying a magnetic field in order to rotate the polarization plane, so that the whole optical head can be small in size, light in weight and cheap in cost.

The present invention is not limited to the embodiments explained above, but many modification and alternations may be conceived by those skilled in the art within the scope of the invention. For instance, in the above embodiments, the so-called three beam method is utilized, but the present invention can be equally applied to the single beam method. In this case, the first diffraction gratings for dividing the incident light beam into the three beams may be deleted from the hologram element 26 and the light receiving elements 22a-1, 22a-5, 22b-1 and 22b-5 are deleted and each of the light receiving elements 22a-3 and 22b-3 is formed to have two light receiving regions divided in the direction Y. Then, the tracking error signal may be derived from the output signals from the light receiving regions of the elements 22a-3 and 22b-3 in a push-pull method. The information signal and focusing error signal may be obtained in the same manner as that of the previous embodiments.

In the above embodiments, the Wollaston prism is set to be $\theta_1=\theta_2=45°$ in order to satisfy the condition that Ia/Iin= Ic/Iin=0.25 and Ib/Iin=0.5. However, according to the invention, it is possible to set the azimuth angles $\theta_1$ and $\theta_2$ of the Wollaston prism such that a ratio of the intensities of the light beams divided by the Wollaston prism is determined at will. For instance, when $\theta_1$ is set to 45° and $\theta_2$ is set to $\arcsin(0.2)^{1/2}=26.6°$, Ia/Iin=Ic/Iin=0.4 and Ib/Iin= 0.2. In this manner, by suitably setting the azimuth angles of the Wollaston prism, it is possible to match the light efficiency of the incident light path and the signal detection sensitivity with the electric circuit optimally. Furthermore, the exit angles of the divided beams emanating from the Wollaston prism may be set at will by suitably selecting the apex angle of the crystal plates 27a and 27b.

Further, in the first and second embodiments, the rotator 28 is provided and in the third embodiment, the quarter-wavelength plate 41 is arranged, but according to the invention, these polarizing elements may be dispensed with. Such an optical head may be advantageously used for the optical record medium such as compact disk and optical card.

In the third embodiment, the direction of the hologram 26b of the optical element 26 may be set to be substantially perpendicular to the track direction X of the magneto-optical record disk 30 like as the direction of the gratings 26a for dividing the incident light beam into three beams. Moreover, in the third embodiment, the light beam including the right-hand and left-hand circularly polarized components is made incident upon the magneto-optical record disk, but according to the invention either one of the right-hand and left-hand circularly polarized beam may be incident upon the record disk. As can be understood from the third embodiment, the information signal can be detected on the basis of the circularly polarized component of the return light beam from the magneto-optical record disk 30, and thus in the third embodiment, the quarter-wavelength plate 41 may be replace by other wavelength plate so that an elliptically polarized light including the circularly polarized component may be made incident upon the magneto-optical record disk.

As explained above in detail, in the optical head according to the invention, the Wollaston prism formed by cementing the two crystal plates having different optic axes is arranged in the optical path which is common both to the forward light beam and the return light beam, and therefore the optical system can be aligned substantially along a rectilinear line and the light source and photodetecting means can be arranged on the same substrate. Therefore, the optical head can be made small in size, simple in construction and cheap in cost, and further the function of the optical head is hardly affected by the variation in environmental factors such as temperature, so that the reliability of the optical head is very high.

What is claimed is:

1. An optical head comprising:

a light source emitting a forward light beam;

an objective lens for projecting the forward light beam onto a magneto-optical record medium as a light spot, information being recorded on a record plane of said magneto-optical record medium;

a photodetecting means for receiving a return light beam reflected by the magneto-optical record medium to detect the information recorded on the record plane of the magneto-optical record medium and further information representing a positional deviation of the light spot with respect to the record plane of the magneto-optical record medium;

a Wollaston polarizing prism provided in a common optical path along which both at least part of the forward light beam and at least part of the return light beam propagate, said Wollaston polarizing prism being formed by cementing two crystal plates in such a manner that an angle between major axes of Normal-ellipsoids of the two crystal plates is about 45 degrees; and an optical element, disposed in the common optical path between the Wollaston polarizing prism and the magneto-optical record medium, for rotating a polarizing direction of said at least part of the forward light beam and for rotating a polarizing direction of said at least part of the return light beam.

2. An optical head according to claim 1, wherein said optical element is an azimuth rotator arranged in the common optical path between the Wollaston prism and the objective lens.

3. An optical head according to claim 2, wherein said azimuth rotator is a Faraday rotator.

4. An optical head according to claim 1, wherein said optical element is a quarter-wavelength plate arranged in the common optical path between the Wollaston prism and the objective lens.

5. An optical head according to claim 1, wherein a portion of the forward light beam which is not refracted by the Wollaston prism is made incident upon the optical record medium as a recording/reproducing light beam.

6. An optical head according to claim 1, wherein said light source and photodetecting means are arranged on a same substrate.

7. An optical head according to claim 1, wherein the Wollaston polarizing prism is formed by cementing two wedge-shaped crystal plates having optical axes extending in different directions.

8. An optical head comprising:

a light source emitting a forward light beam;

diffraction gratings for dividing said at least part of the forward light beam into three light beams;

an objective lens for projecting the three light beams onto an optical record medium as light spots, information being recorded on a record plane of said optical record medium;

a hologram for receiving return light beams reflected by the optical record medium and dividing at least some of the return light beams into a plurality of light beams;

a photodetecting means for receiving the plurality of light beams from the hologram to detect the information recorded on the record plane of the optical record medium and further information representing a positional deviation of the light spots with respect to the record plane of the optical record medium; and a Wollaston polarizing prism provided in a common optical path along which both at least part of the forward light beam and at least one of the return light beams propagate;

said diffraction gratings and said hologram being formed on an optical element arranged in the common optical path.

9. An optical head comprising:

a light source for emitting a forward light beam;

an objective lens for projecting the forward light beam onto an optical record medium as a light spot, information being recorded on a record plane of said optical record medium;

a photodetecting means for receiving a return light beam reflected by the optical record medium to detect the information recorded on the record plane of the optical record medium and further information representing a positional deviation of the light spot with respect to the record plane of the optical record medium;

a Wollaston polarizing prism provided in a common optical path along which both at least part of the forward light beam and at least part of the return light beam propagate; and dividing means, disposed in the common optical path between the Wollaston polarizing prism and the light source, for dividing at least one of the forward light beam and the return light beam so that the return light beam forms multiple light spots on the photodetecting means, the photodetecting means detecting the information and the further information by detecting the multiple light spots.

* * * * *